United States Patent [19]

Smith

[11] 4,071,936

[45] Feb. 7, 1978

[54] CRIMPING APPARATUS

[75] Inventor: John Lionel Smith, Bedford, England

[73] Assignee: Imperial-Eastman (UK) Limited, St. Neots, United Kingdom

[21] Appl. No.: 675,793

[22] Filed: Apr. 12, 1976

[30] Foreign Application Priority Data

Apr. 16, 1975 United Kingdom ............... 15626/75

[51] Int. Cl.[2] ............................................ B23P 19/04

[52] U.S. Cl. ........................................ 29/237; 72/402; 72/452

[58] Field of Search .................... 29/237; 72/402, 355, 72/452

[56] References Cited

U.S. PATENT DOCUMENTS

| | | | |
|---|---|---|---|
| 1,782,219 | 11/1930 | Wallace | 29/237 |
| 2,311,662 | 2/1943 | Hunziker | 29/237 |
| 3,568,494 | 3/1971 | Geisman | 29/237 |

*Primary Examiner*—James L. Jones, Jr.

*Attorney, Agent, or Firm*—Cumpston & Shaw

[57] ABSTRACT

An apparatus for crimping couplings to hose ends having a crimping ring with a tapered camming surface and a plurality of circumferentially-disposed crimping dies having crimping surfaces for crimping the couplings and opposed camming surfaces for cooperation with the crimping ring camming surface, means for moving the crimping ring or dies relative to one another to provide the crimping action with the movable element being moved to the same stop position each time of operation irrespective of the extent of crimp desired, and means for adjusting the relative position between crimping ring and dies at the location where the movable element is at the said stop position so as to provide adjustment for the extent of crimp.

4 Claims, 3 Drawing Figures

CRIMPING APPARATUS

Figure 1:
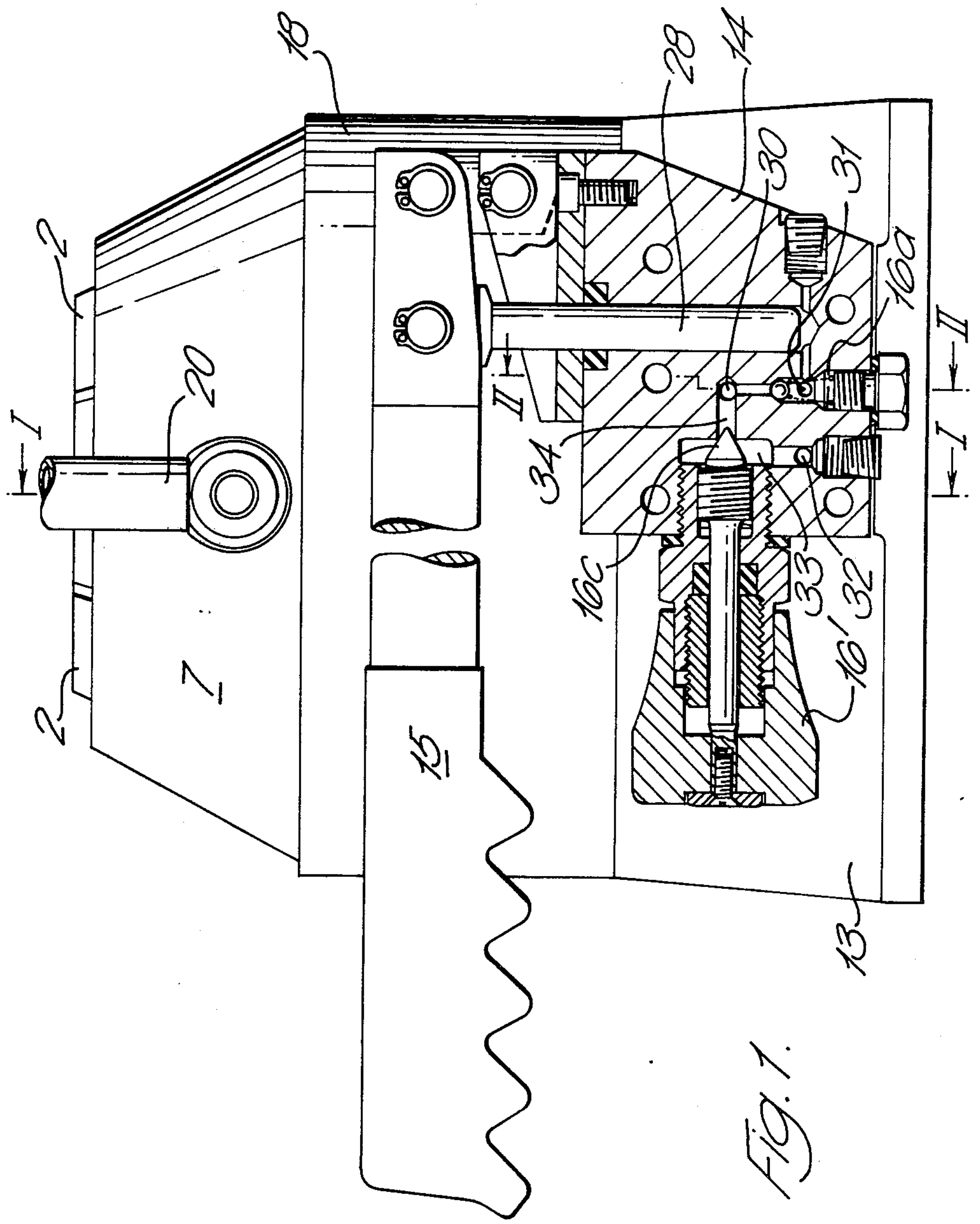

This invention relates to apparatus for crimping couplings to hose ends.

One known crimping apparatus for securing couplings to hose ends is described in British Patent specification No. 962,094. In such apparatus, a plurality of circumferentially-disposed dies are forced against a coupling which is to be crimped to a hose end by the cooperative action of tapered camming surfaces moving relative to one another. One camming surface is provided on each crimping die and another camming surface, cooperable with that on each of the dies, is provided in form of a circumferential forcing or crimping ring. The dies are secured in the apparatus against vertical movement and the crimping ring is forced vertically against the dies by means of a hydraulic pump mechanism. The cooperation of the tapering camming surfaces forces the dies inwardly, tranverse to the direction of movement of the crimping ring, to crimp the coupling onto the hose.

The extent to which crimping takes place is adjusted and monitored by varying the stroke of the hydraulic pump either by employing a visual gauge showing relative movement between the crimping ring and the dies, or by the actuation of a hydraulic control valve which terminates the vertical advance of the crimping ring (and therefore the transverse movement of the dies) when a predetermined position has been reached.

The present invention relates to a crimping apparatus in which the crimping ring is secured against vertical movement during use and the circumferentially-disposed dies are moved vertically into the crimping ring to the same vertical position irrespective of the extent of crimp required. The extent of crimp may be altered as desired by providing means for adjustment of the relative positions of the cooperable camming surfaces when the dies are in their position of maximum vertical extent.

According to the invention, there is provided an apparatus for crimping a coupling to a hose end which comprises a crimping ring having its inner wall formed as a tapered camming surface, a plurality of circumferentially-disposed crimping dies each having a crimping surface for crimping a coupling to a hose end and an opposed tapered camming surface for cooperation with the camming surface of the crimping ring, means for moving the crimping ring or the crimping dies relative to one another so that cooperation between the camming surfaces causes a transverse movement of the crimping dies inwardly of the crimping ring and parallel to the plane thereof to provide a crimping action, the movable one of the crimping ring and the dies being moved to the same position of each time of operation irrespective of the extent of crimp desired, and means for adjusting the relative position between the crimping ring and the dies at the location where the said movable one of the crimping ring and the dies is at the said same position so as to provide adjustment for the extent of the crimp.

Although in this specification the invention will be described in relation to a fixed crimping ring and movable dies, it will be appreciated that the invention could also apply to fixed dies and a movable crimping ring with means being provided for adjusting the fixed position of the dies when the movable crimping ring is at its position of maximum vertical extent against the dies.

Preferably the adjusting means adjust the position of the unmovable one of the crimping ring and dies relative to the said same position of the movable one.

Preferably the means for moving the crimping ring and crimping dies relative to one another comprises a hydraulic pump mechanism. The piston of the hydraulic pump can be employed to provide the necessary movement to the crimping dies and the crimping ring can be secured to the chamber of the hydraulic pump. It can be ensured that the dies are moved to the same position each time of operation by providing a stop against which the piston will eventually bear during operation of the apparatus. The means for adjusting the position of the crimping ring relative to the stop position of the piston (and therefore of the crimping dies) can be provided by threadly-mounting the crimping ring to the chamber. Rotation of the crimping ring on the threads will hence increase or decrease the extent to which the crimping dies may enter the crimping ring and hence the extent to which the cooperation between the camming surfaces takes place.

Figure 2:
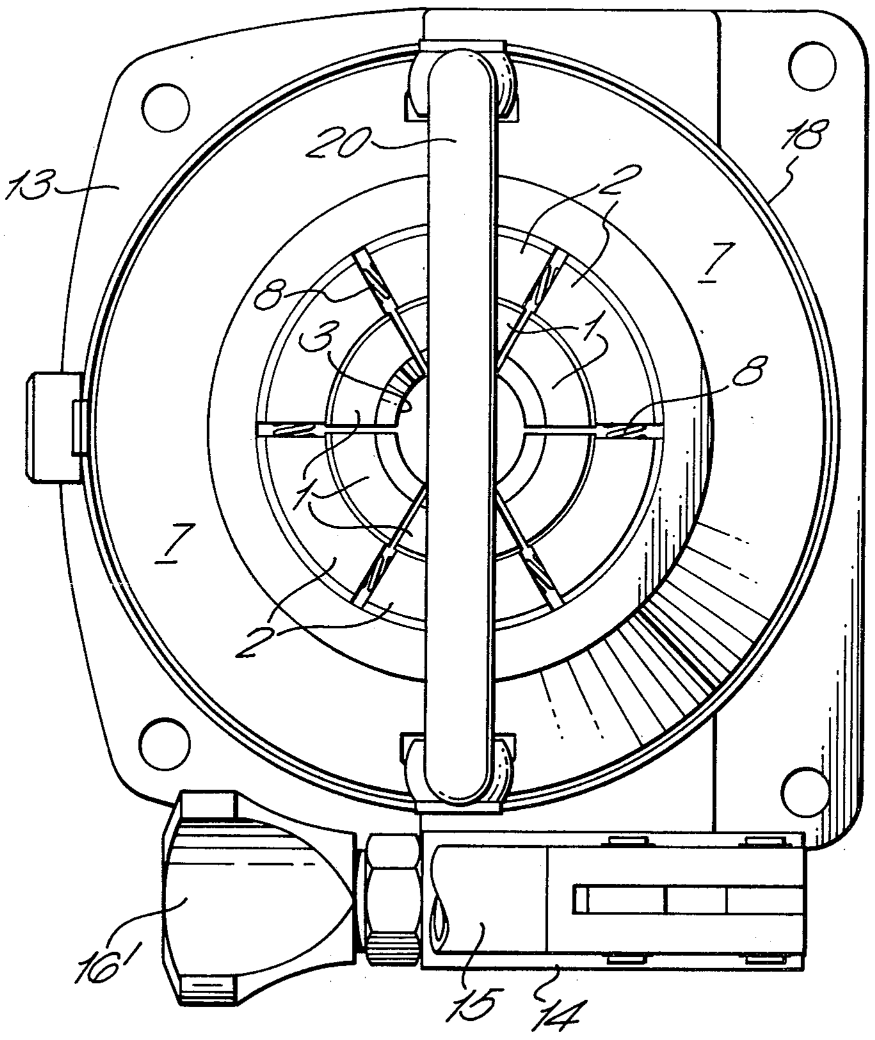
Figure 3:
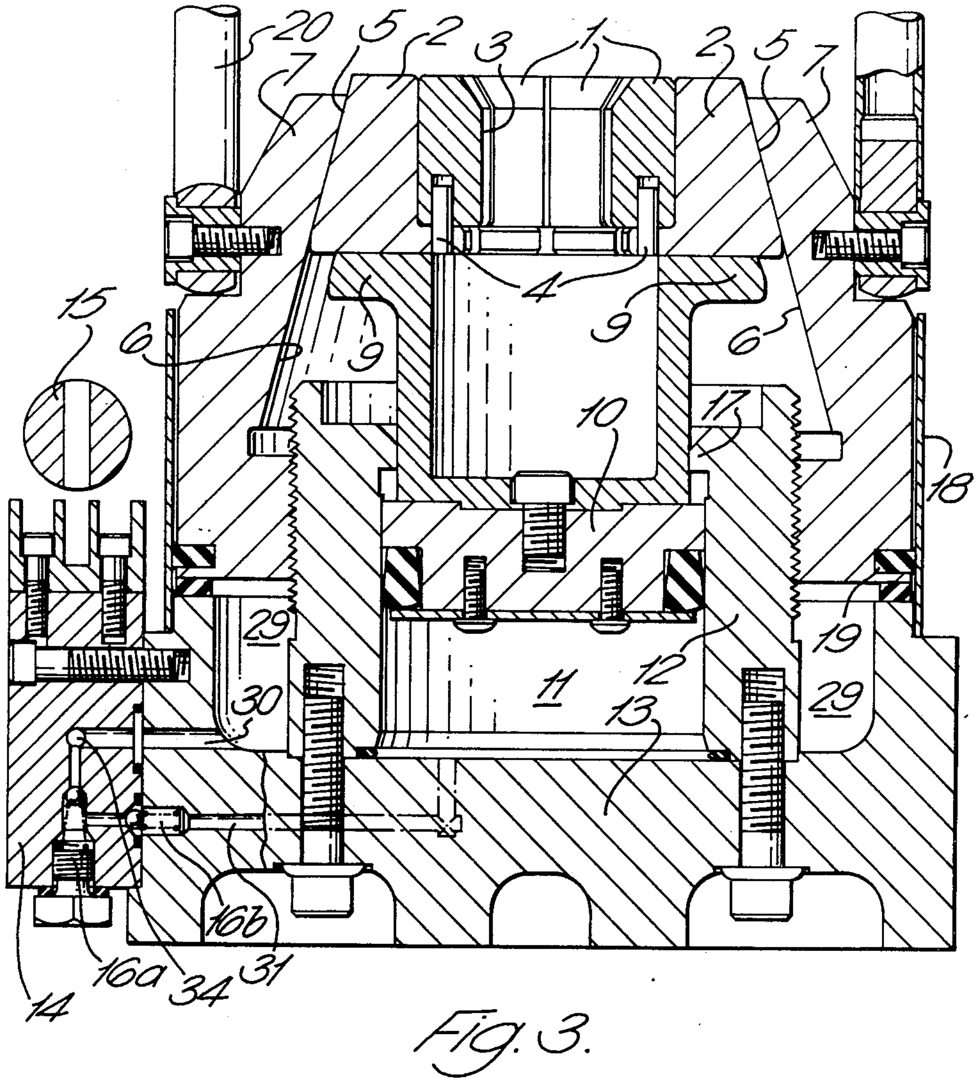

A preferred embodiment of the invention is illustrated in the accompanying drawings, in which:

FIG. 1 is a side elevation of a crimping apparatus of the invention, with parts broken away, FIG. 2 is a plan view of the apparatus of FIG. 1, FIG. 3 is a section viewed along the line I—I of FIG. 1 for the main body of the apparatus, and along the line II—II for the hydraulic pump, Referring to the drawings, the apparatus comprises six crimping dies each consisting of an inner die member 1 and an outer die member 2. Each inner die member 1 has a crimping surface 3 for crimping a coupling onto a hose in a manner similar to that described in British Patent specification No. 962,094. Each outer die member 2 is provided with a peg 4 on which each respective inner die member rests. The outer die members 2 hence acts as supports for the inner members 1. Each outer die member 2 is provided with a tapered camming surface 5. The camming surfaces 5 cooperate with a corresponding camming surface 6 of a crimping ring 7. The outer die members 2 are spaced apart by springs 8.

The outer die members 2 rest on a platform 9 which, in turn, is secured to and rests on a piston 10. The piston 10 is movable within a chamber 11, formed by a wall 12 and base 13. Movement of the piston 10 is effected by means of a hydraulic pump 14 which is actuated by up-and-down motion of a pump handle 15. Non-return valves 16*a*, 16*b* and a control handle 16' operating a by-pass valve 16 *c* are provided as is conventional with hydraulic pumps.

The wall 12 is provided with an inwardly-turned lip 17 which acts as a stop for the upward movement of piston 10. The crimping ring 7 is threadly-mounted on the exterior surface of wall 12 so that, by variation of the position of ring 7 on the threads on wall 12, the relative position of camming surface 6 to the position of piston 10 at its uppermost position (against lip 17) may be varied.

An outer wall 18 rests on base 13 and a sealing gasket 19 is provided to prevent leakage of hydraulic oil from between the outer wall 18 and crimping ring 7. Since adjustment of the position of crimping ring 7 relative to the wall 12 as described above will result in movement of crimping ring 7 relative to outer wall 18, the extent of movement can be gauged relative to a datum mark on the outer wall (not shown).

A handle 20 is provided for easy transportation of the apparatus.

The apparatus operates as follows. A coupling to be crimped onto the end of a hose is slipped over the hose end in the manner described in British Patent specification No. 962,094. Inner die members 1 appropriate to the size of the couplings are placed on pegs 4 and the position of crimping ring 7 relative to wall 12 is selected as appropriate by rotation on the threads and gauged relative to the datum mark on outer wall 18 mentioned above. The coupling is placed within the volume encompassed by inner die members 1 and the hydraulic pump 14 operated so as to force piston 10 upwardly until it stops against lip 17. The corresponding upward movement of platform 9 and outer die members 2 provides a camming action between camming surfaces 5 and 6 and results in an inward crimping movement of the crimping dies. The crimping surfaces 3 of inner die members 1 are pressed against the coupling and crimp the latter to the end of the hose. The hydraulic pressure within the chamber is then released by operation of the by-pass valve 16.

A camming action between surfaces 5 and 6 then tends to take place in a reverse direction to that which occurred during crimping. This reverse movement is a result of the cooperative action of springs 8 which tend to increase the circumference of outer die members 2. This, together with the weight of the die members and piston which acts downwardly, tends to force hydraulic fluid out of chamber 11 thus enabling the crimped coupling to be released from between the dies. The apparatus is now ready to crimp a further coupling.

It will be appreciated that inner die members 1 of various sizes may be selected for mounting on pegs 4 so as to provide the apparatus with the capability of crimping couplings of different sizes. Furthermore, the extent to which crimping will occur may be accurately gauged by the positioning of crimping ring 7 relative to the datum mark on outer wall 18. For example, in one apparatus constructed according to the invention, the crimping ring 7 has been mounted on wall 12 with a 16 T.P.I. thread. One revolution of the crimping ring 7 results in a change in its vertical position relative to the piston in its uppermost position (and, correspondingly, to the crimping dies in their uppermost position) of 0.062 inch. By taking the angle of taper on the camming surface into account this represented a variation in crimping diameter of 0.033 inch. By dividing the circumference of crimping ring 7 into 4 graduations disposed at 90° to one another, movement of the ring between two adjacent graduations relative to the datum mark will provide a change in crimping diameter of 0.0082 inch.

The hydraulic pump mechanism is conventional, but its operation will be briefly described. Initially the control handle 16' is adjusted so that by-pass valve **16*c* is closed (the conical valve surface contacting the adjacent portion of the valve body — see FIG. 1). Operation of the pump handle 15 provides an up-down motion for plunger 28 (FIG. 1) which causes hydraulic fluid to be drawn from a reservoir 29 (FIG. 3) through an upper horizontal passageway 30, downwardly past non-return valve 16*a*, through a lower horizontal passageway 31 (past non-return valve 16*b*) and into chamber 11. On completion of the upward movement of piston 10 in chamber 11, the control handle 16' is rotated to open by-pass valve 16*c*. An unobstructed path then exists for the return of the hydraulic fluid to the reservoir. This path consists of a further lower horizontal passageway (located behind passageway 31 in FIG. 3, but indicated in end-view at 32 in FIG. 1) communicating with chamber 11, a chamber 33, and a horizontal passageway 34 communicating with upper horizontal passageway 30**.

I claim:

1. An apparatus for crimping a coupling to a hose end which comprises a crimping ring having its inner wall formed as a tapered camming surface, a plurality of circumferentially-disposed crimping dies each having an outer die member having an opposed tapered camming surface for cooperation with the camming surface of the crimping ring and an inner die member releasibly mounted on said outer die member and having a crimping surface for crimping a coupling to a hose end, hydraulic piston and cylinder means for moving the crimping ring or the crimping dies axially relative to one another from a start position to an end position so that cooperation between the camming surfaces causes a transverse movement of the crimping dies inwardly of the crimping ring and parallel to the plane thereof to provide a crimping action, said cylinder having a stop against which said piston will bear during the operation of the apparatus whereby the movable one of the crimping ring and the dies are moved through the same axial distance each time of operation irrespective of the extent of crimp desired, and means for adjusting the relative axial position between the crimping ring and the dies at said start position so as to provide adjustment for the extent of the crimp by a corresponding adjustment of the relative axial position between the crimping ring and dies at said end position.

2. An apparatus according to claim 1 wherein a platform is mounted on the piston and upon which each of said outer die members rests.

3. An apparatus according to claim 2 wherein the releasably mounting means comprises a peg and socket mounting for each pair of inner and outer die members.

4. An apparatus according to claim 1 wherein the crimping ring is threadly mounted on the chamber of said hydraulic pump.

* * * * *